| (12) | United States Patent | (10) Patent No.: | US 9,494,274 B1 |
|---|---|---|---|
| | Chen | (45) Date of Patent: | Nov. 15, 2016 |

(54) SWINGABLE LOADING DEVICE

(71) Applicant: Ko-Po Chen, Taichung (TW)

(72) Inventor: Ko-Po Chen, Taichung (TW)

( * ) Notice: Subject to any disclaimer, the term of this patent is extended or adjusted under 35 U.S.C. 154(b) by 0 days.

(21) Appl. No.: 14/987,798

(22) Filed: Jan. 5, 2016

(51) Int. Cl.
*F16M 13/00* (2006.01)
*F16M 11/18* (2006.01)

(52) U.S. Cl.
CPC .......... *F16M 11/18* (2013.01); *F16M 2200/00* (2013.01)

(58) Field of Classification Search
CPC .. F16M 11/18; F16M 2200/00; B60N 2/062; B60N 2/0735; B60N 2/0745
USPC ..................... 248/424, 222.52, 274.1, 276.1; 296/65.11; 297/344.11
See application file for complete search history.

(56) References Cited

FOREIGN PATENT DOCUMENTS

TW    M400790    4/2011
WO    WO 2007056166 A2 *    5/2007    ........... B60N 2/0745

* cited by examiner

*Primary Examiner* — Todd M Epps
(74) *Attorney, Agent, or Firm* — Alan D. Kamrath; Kamrath IP Lawfirm, P.A.

(57) ABSTRACT

A swingable loading device contains: a base, a support rack fixed above the base, a swing mechanism and an adjustment mechanism which are housed between the base and the support rack. The swing mechanism includes a first rotatable arm set fixed on the base and driven by a first drive source and includes a second rotatable arm set rotatably connected with a rotary shaft, the first rotatable arm set and the support rack. The first rotatable arm set drives the second rotatable arm set to swing reciprocately along the rotary shaft, and the second rotatable arm set drives the support rack to swing reciprocately. The adjustment mechanism includes a displacement assembly fixed on the second rotatable arm set which drives the first rotatable arm set to move along the second rotatable arm set so as to adjust a distance between the first rotatable arm set and the rotary shaft.

10 Claims, 10 Drawing Sheets

SWINGABLE LOADING DEVICE

FIELD OF THE INVENTION

The present invention relates to a swingable loading device which is capable of adjusting a holding plate to swing back and forth based on desired amplitudes.

BACKGROUND OF THE INVENTION

Figure 1:
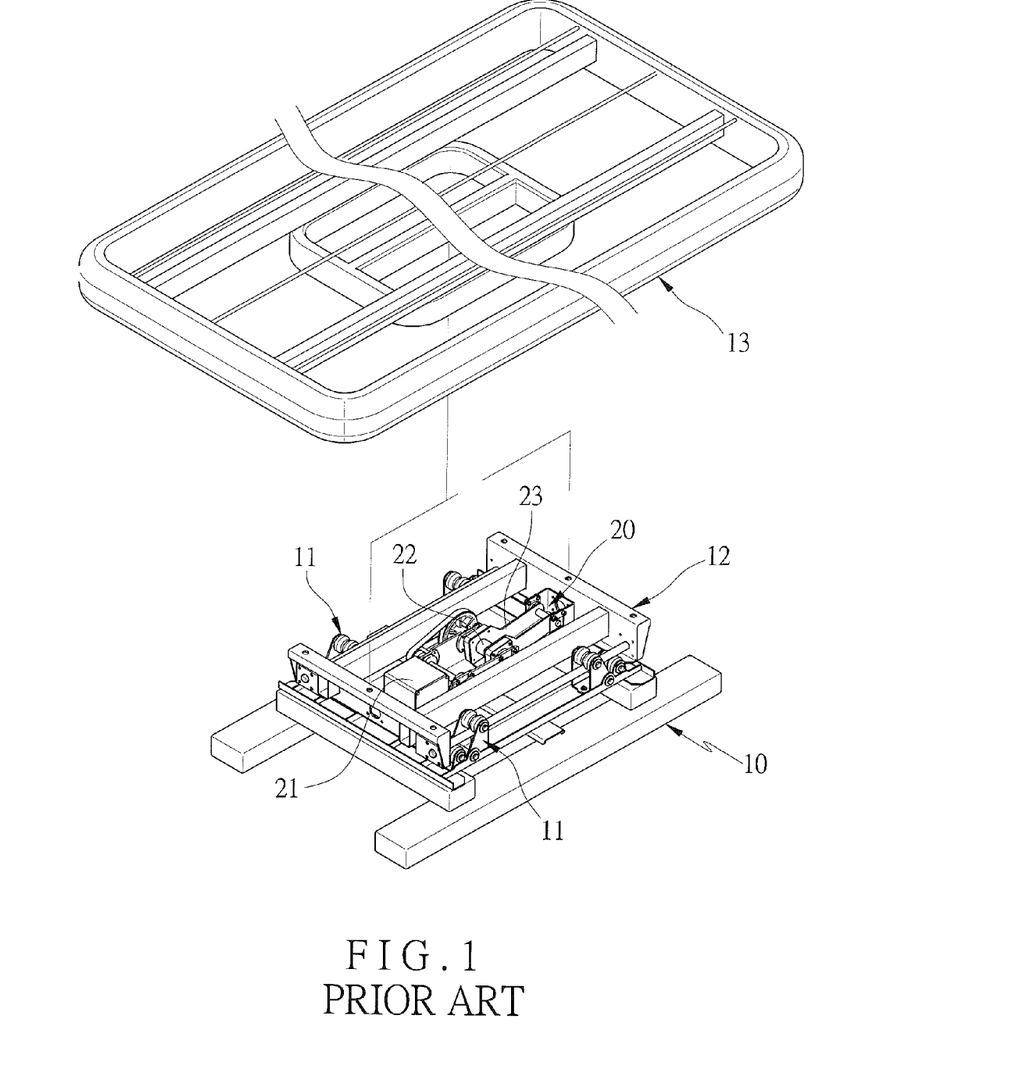
FIG. 1 is a perspective view of a conventional sliding device disclosed in TW Publication No. M400790.
Figure 2:
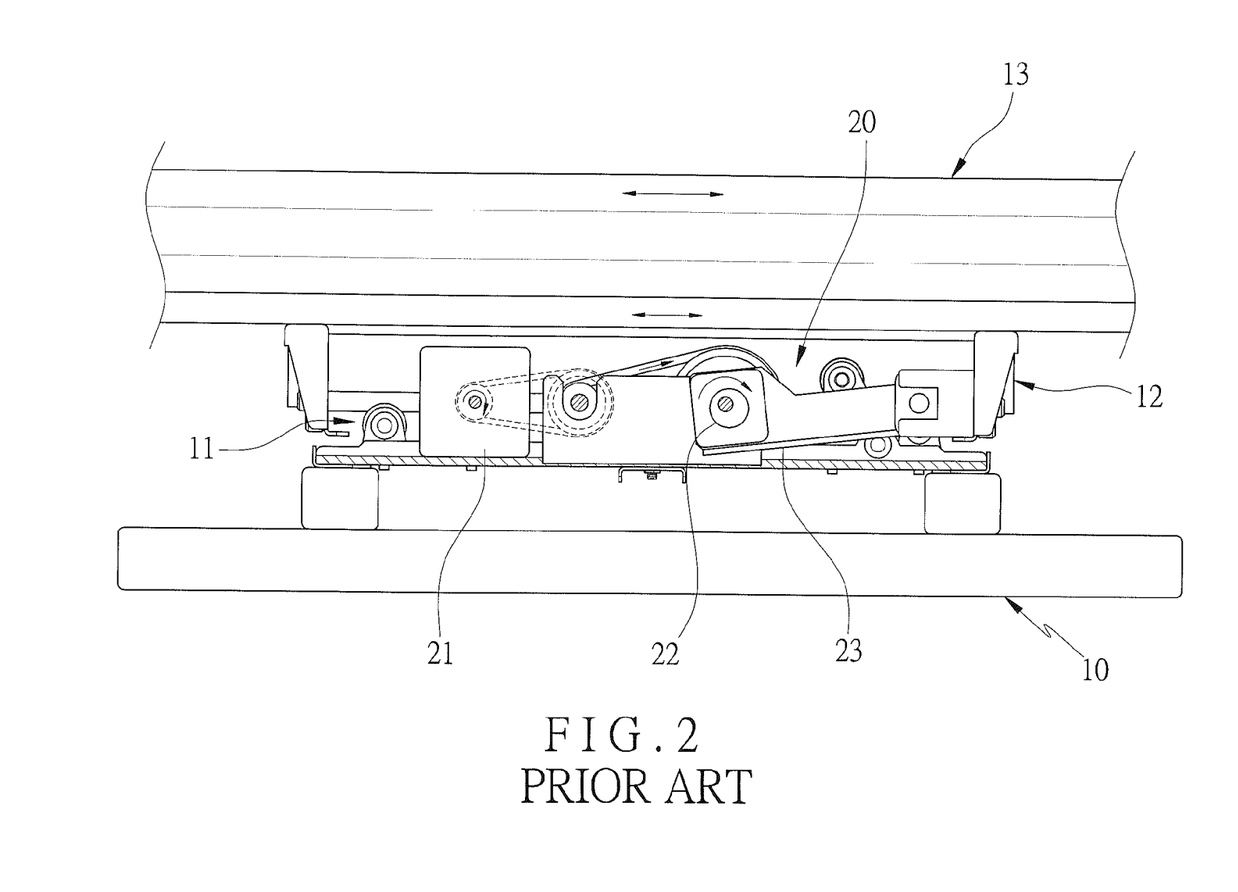
FIG. 2 is a side plan view of the conventional sliding device disclosed in TW Publication No. M400790.

Referring to FIGS. 1 and 2, a sliding device is disclosed in TW Publication No. M400790 and contains: a base 10, a plurality of roller sets 12 configured to support a slidable rack 12, and a holding plate 13 disposed on the slidable rack 12, such that the slidable rack 12 and the holding plate 13 slide reciprocately on the base 10. Between the base 10 and the slidable rack 12 is defined a driving mechanism 20, and the driving mechanism 20 includes a power source 21 mounted on the base 10 and configured to drive an eccentric shaft 22 to rotate, and a swing arm 23 is rotatably connected with the eccentric shaft 22 and the slidable rack 12, such that the eccentric shaft 22 rotates to drive the swing arm 23 to swing back and forth, and the swing arm 23 actuates the slidable rack 12 and the holding plate 13 to slide reciprocately. However, the slidable rack 12 and the holding plate 13 cannot be adjusted to slide based on desired amplitudes.

The present invention has arisen to mitigate and/or obviate the afore-described disadvantages.

SUMMARY OF THE INVENTION

The primary objective of the present invention is to provide a swingable loading device which contains a support rack fixed above a base, and a swing mechanism housed between the base and the support rack, wherein the swing mechanism includes a crank shaft mounted on the base and configured to drive a first rotatable arm set to swing reciprocately, a second rotatable arm set rotatably connected with a rotary shaft on the base, and the second rotatable arm set also rotatably connects with an end portion of the first rotatable arm set and the support rack, such that the first rotatable arm set drives the second rotatable arm set to swing back and forth along the rotary shaft, and the second rotatable arm set drives the support rack to swing reciprocately.

Another objective of the present invention is to provide a swingable loading device which contains an adjustment mechanism which includes a displacement assembly fixed on the second rotatable arm set, wherein the displacement assembly drives the end portion of the first rotatable arm set to move along the second rotatable arm set so as to adjust a distance between the end portion of the first rotatable arm set and the rotary shaft of the second rotatable arm set, such that the first rotatable arm set actuates the second rotatable arm set to swing back and forth at different amplitudes, and the second rotatable arm set derives the support rack to swing reciprocately at the different amplitudes.

DETAILED DESCRIPTION OF THE PREFERRED EMBODIMENTS

Figure 3:
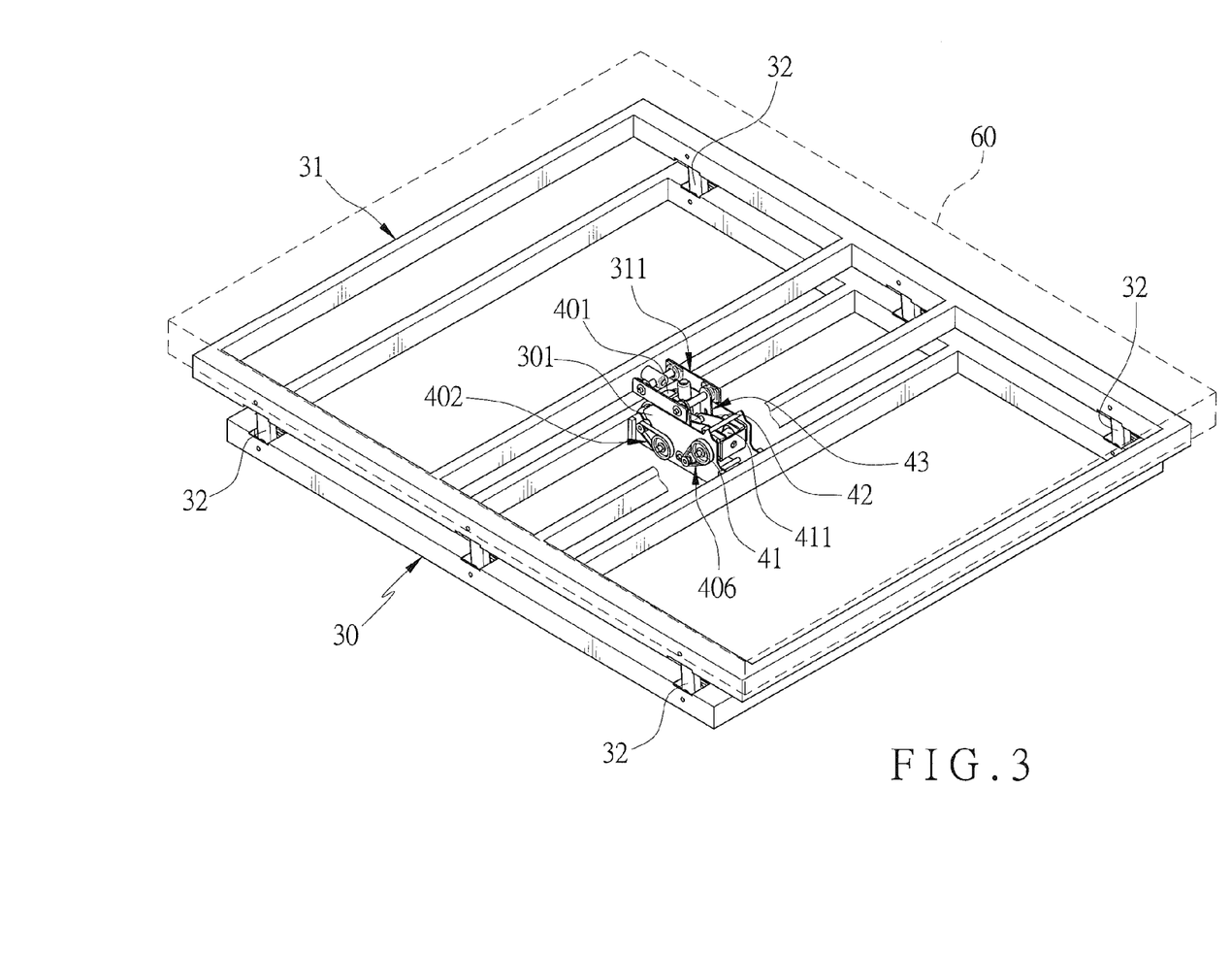
FIG. 3 is a perspective view showing the assembly of a swingable loading device according to a preferred embodiment of the present invention.
Figure 4:
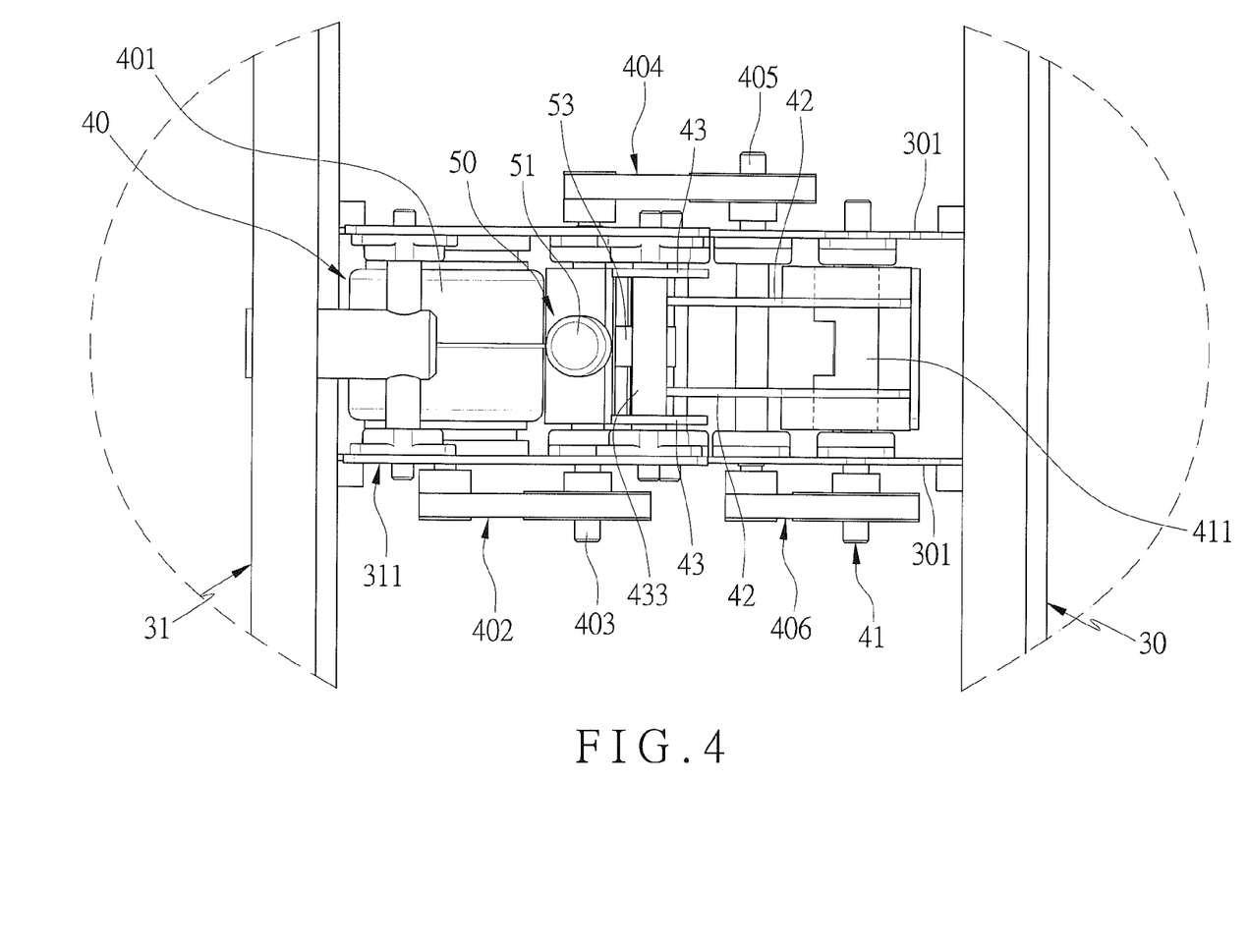
FIG. 4 is a top plan view showing the assembly of a part of the swingable loading device according to the preferred embodiment of the present invention.
Figure 5:
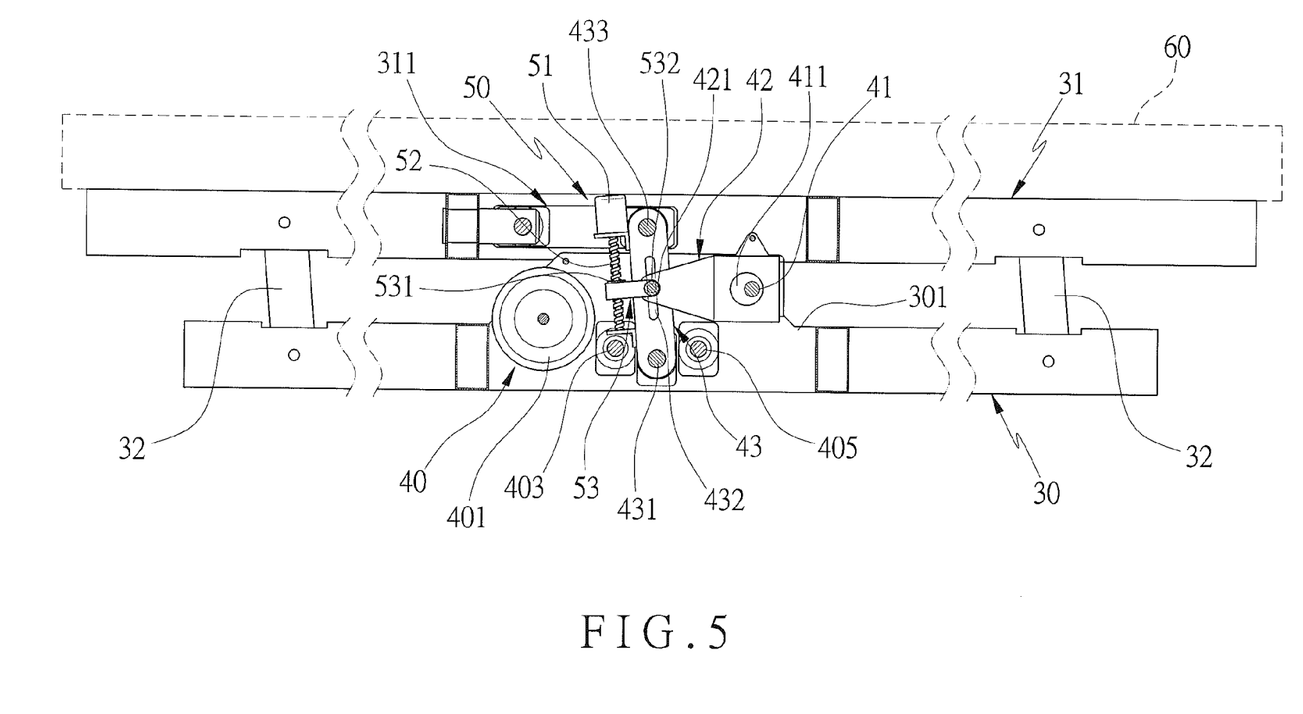
FIG. 5 is a cross sectional view showing the assembly of the swingable loading device according to the preferred embodiment of the present invention.

With reference to FIGS. 3 to 5, a swingable loading device according to a preferred embodiment of the present invention comprises: a base 30, a support rack 31, a swing mechanism, and an adjustment mechanism.

The base 30 is a rectangular frame, the support rack 31 is fixed and swings back and forth above the base 30, and a plurality of posts 32 are mounted between and rotatably connected with the base 30 and the support rack 31, such that the support rack 31 swings back and forth above the base 30 along the plurality of posts 32. The base 30 includes two fixing plates 301 disposed adjacent to a central position thereof, and between the two fixing plates 301 is defined an accommodation space for housing the swing mechanism and the adjustment mechanism between the base 30 and the two fixing plates 301, such that the swing mechanism and the adjustment mechanism drive the support rack 31 to swing back and forth above the base 30. The swing mechanism includes a crank shaft 41 mounted on the base 30 and driven by a first drive source 40 to rotate, wherein the crank shaft 41 has an eccentric section 411 which rotatably connects with a first rotatable arm set 42, such that when the crank shaft 41 is driven by the first drive source 40 to rotate, the eccentric section 411 of the crank shaft 41 drives the first rotatable arm set 42 to swing back and forth. In this embodiment, the first drive source 40 is a first motor 401 housed between the two fixing plates 301, and an output shaft of the first motor 401 and the crank shaft 41 connect with a transmission structure, such that the first motor 401 drives the crank shaft 41 to revolve via the transmission structure, and the eccentric section 411 of the crank shaft 41 drives the first rotatable arm set 42 to swing back and forth, wherein the transmission structure includes the output shaft of the first motor 401, a first belt pulley set 402 connected with the output shaft of the first motor 401, a first transmission shaft 403 coupled with the first belt pulley set 402, a second belt pulley set 404 joined with the first transmission shaft 403, a second transmission shaft 405 connected with the second belt pulley set 404, and a third belt pulley set 406 coupled with the second transmission shaft 405 and the crank shaft 41, such that the first motor 401 drives the crank shaft 41 to rotate through the first belt pulley set 402, the first transmission shaft 403, the second belt pulley set 404, the second transmission shaft 405, and the third belt pulley set 406. The base 30 further includes a rotary shaft 431 secured thereon and rotatably connected with a lower end of a second rotatable arm set 43, such that the second rotatable arm set 43 swings along the rotary shaft 431. In addition, the second rotatable arm set 43 is rotatably coupled with an end portion of the first rotatable arm set 42 and the support rack 31, such that the first rotatable arm set 42 actuates the second rotatable arm set 43, the second rotatable arm set 43 swings back and forth along the rotary shaft 431, and the second rotatable arm set 43 drives the support rack 31 to swing reciprocately. In this embodiment, the first rotatable arm set 42 has an actuation shaft 421 disposed on the end portion thereof and rotatably coupled with the second rotatable arm set 43, such that the first rotatable arm set 42 actuates the second rotatable arm set 43 to move back and forth. The second rotatable arm set 43 has a connecting post 433 mounted on an upper end thereof, and the support rack 31 includes a coupling element 311 configured to rotatably connect with the connecting post 433 of the second rotatable arm set 43, hence the second rotatable arm set 43 drives the support rack 31 to swing back and forth.

The adjustment mechanism includes a displacement assembly 50 fixed on the second rotatable arm set 43, wherein the displacement assembly 50 drives the actuation shaft 421 of the first rotatable arm set 42 to move along the second rotatable arm set 43 so as to adjust a distance between the actuation shaft 421 of the first rotatable arm set 42 and the rotary shaft 431 of the second rotatable arm set 43, hence the second rotatable arm set 43 actuates the second rotatable arm set 43 to swing reciprocately at different amplitudes, and the second rotatable arm set 43 drives the support rack 31 to reciprocately at the different amplitudes. In this embodiment, the displacement assembly 50 includes a second drive source secured on one side of the second rotatable arm set 43, and the second drive source is a second motor 51 configured to drive a threaded rod 52. The displacement assembly 53 further includes a moving element 53, a first end of which screws with a threaded sleeve 531 of the threaded rod 52, and the moving element 53 has a connection portion 532 configured to rotatably connect with the actuation shaft 421 of the first rotatable arm set 42. The second rotatable arm set 43 has a guiding groove 432 defined thereon so as to accommodate the actuation shaft 421 of the first rotatable arm set 42, and the actuate shaft 421 moves upward and downward along the guiding groove 432, hence the second motor 51 drives the threaded rod 52 to swivel, the threaded rod 52 actuates the moving element 53 to move and drives the actuation shaft 421 to move along the guiding groove 432 of the second rotatable arm set 43, and the distance between the actuation shaft 421 of the first rotatable arm set 42 and the rotary shaft 431 of the second rotatable arm set 43 is adjusted so that the first rotatable arm set 42 drives the second rotatable arm set 43 to swing reciprocately at the different amplitudes, and the support rack 31 is actuated by the third rotatable arm set 43 to swing reciprocately at the different amplitudes. In this embodiment, the support rack 31 further includes a holding plate 60 disposed thereon so that user lies, sits or stands on the holding plate 60. For example, when the user lies on the holding plate 60, the swing mechanism drives the rack support 31 and the holding plate 60 to swing back and forth, and the adjustment mechanism adjusts the support rack 31 and the holding plate 60 to swing reciprocately at the different amplitudes based on using requirements.

Figure 6:
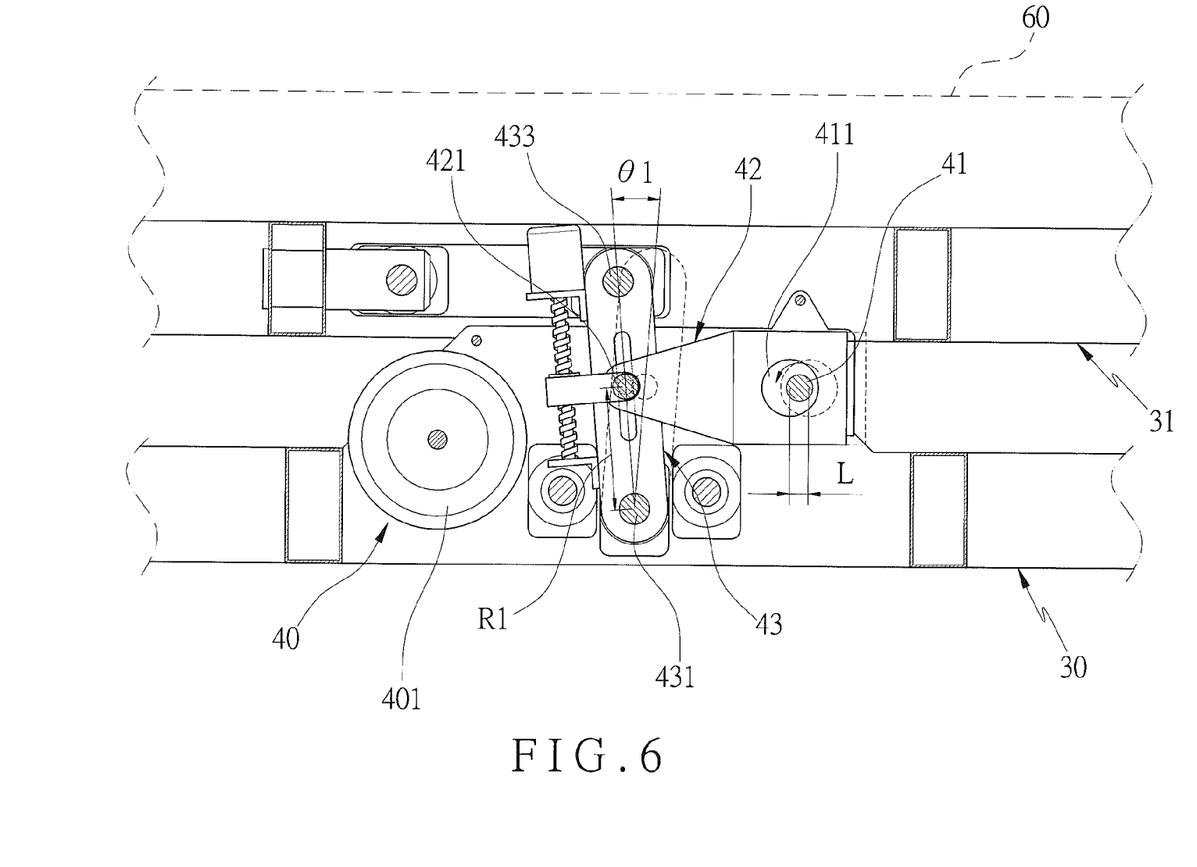
FIG. 6 is a cross sectional view showing the operation of the swingable loading device according to the preferred embodiment of the present invention.

Referring to FIG. 6, in operation, the first motor 401 of the first drive source 40 drives the crank shaft 41 to rotate, the eccentric section 411 of the crank shaft 41 drives the first rotatable arm set 42 to swing back and forth, and the actuation shaft 421 of the first rotatable arm set 42 actuates the second rotatable arm set 43 to swing reciprocately along the rotary shaft 431, wherein a maximum swing distance of the first rotatable arm set 42 is L, the distance between the actuation shaft 421 of the first rotatable arm set 42 and the rotary shaft 431 of the second rotatable arm set 43 is R1, such that the first rotatable arm set 42 drives the second rotatable arm 43 set 43 to swing reciprocately within a first swinging angle θ1, and the connecting post 433 of the second rotatable arm set 43 drives the support rack 31 and the holding plate 60 swing back and forth on the base 30, thus improving sleeping quality.

Figure 7:
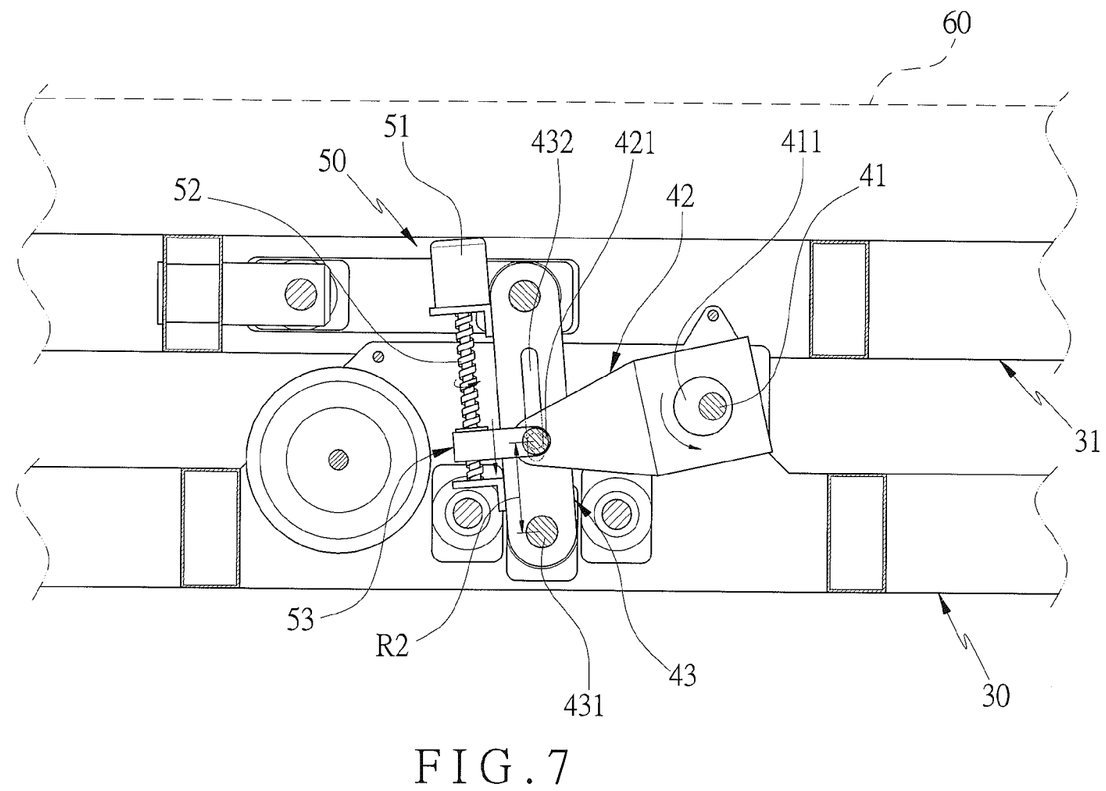
FIG. 7 is another cross sectional view showing the operation of the swingable loading device according to the preferred embodiment of the present invention.

As shown in FIG. 7, the adjustment mechanism adjusts the support rack 31 to swing reciprocately at desired amplitude based on using requirements. For example, the second motor 51 of the displacement assembly 50 drives the threaded rod 52 to rotate, the threaded rod 52 actuates the moving element 53 to move toward the lower end of the second rotatable arm set 43, such that the first rotatable arm set 42 is driven to rotate along the eccentric section 411 of the crank shaft 41, and the actuation shaft 421 of the first rotatable arm set 42 moves toward the rotary shaft 431 of the second rotatable arm set 43 along the guiding groove 432 of the second rotatable arm set 42, hence the distance between the actuation shaft 421 of the first rotatable arm set 42 and the rotary shaft 431 of the second rotatable arm set 43 is decreased to R2.

Figure 8:
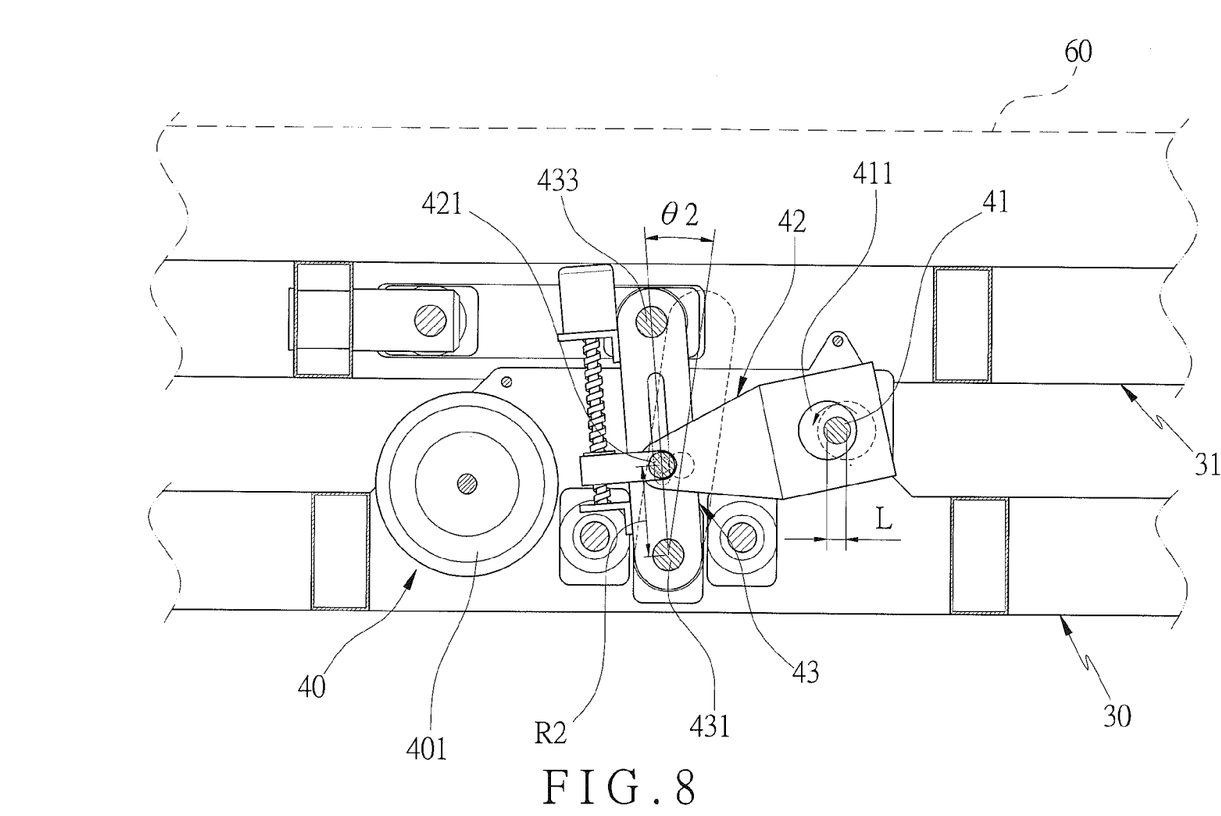
FIG. 8 is also another cross sectional view showing the operation of the swingable loading device according to the preferred embodiment of the present invention.

As illustrated in FIG. 8, when the first motor 401 of the first drive source 40 drives the crank shaft 41 to rotate, the eccentric section 411 of the crank shaft 41 actuates the first rotatable arm set 42 to swing back and forth, and the actuation shaft 421 of the first rotatable arm set 42 drives the second rotatable arm set 43 to swing reciprocately along the rotary shaft 431 of the second rotatable arm set 43. Due to the maximum swing distance of the first rotatable arm set 42 is L which is a fixed value, the distance R2 between the actuation shaft 421 of the first rotatable arm set 42 and the rotary shaft 431 of the second rotatable arm set 43 diminishes so that the first rotatable arm set 42 drives the second rotatable arm set 43 swings reciprocately within a second swinging angle θ2 greater than the first swinging angle θ1, and the connecting post 433 of the second rotatable arm set 43 drives the support rack 31 and the holding plate 60 to swing reciprocately on the base 30 within the second swinging angle θ2. Thereby, the adjustment mechanism adjusts the distance R2 between the actuation shaft 421 of the first rotatable arm set 42 and the rotary shaft 431 of the second rotatable arm set 43 so that the first rotatable arm set 42 drives the second rotatable arm set 43 to swing reciprocately at a larger amplitude, and the support rack 31 and the holding plate 60 are actuated by the third rotatable arm set 43 to swing reciprocately at the larger amplitude.

Figure 9:
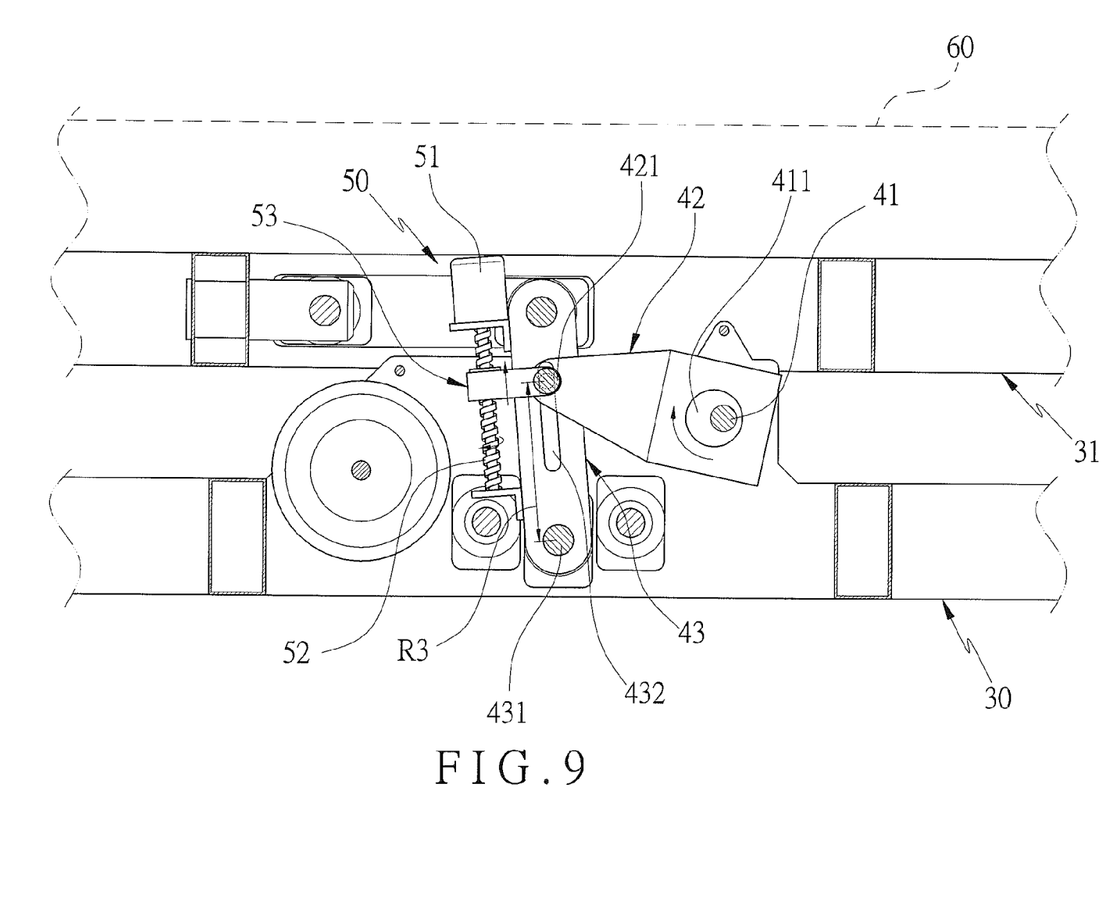
FIG. 9 is still another cross sectional view showing the operation of the swingable loading device according to the preferred embodiment of the present invention.
Figure 10:
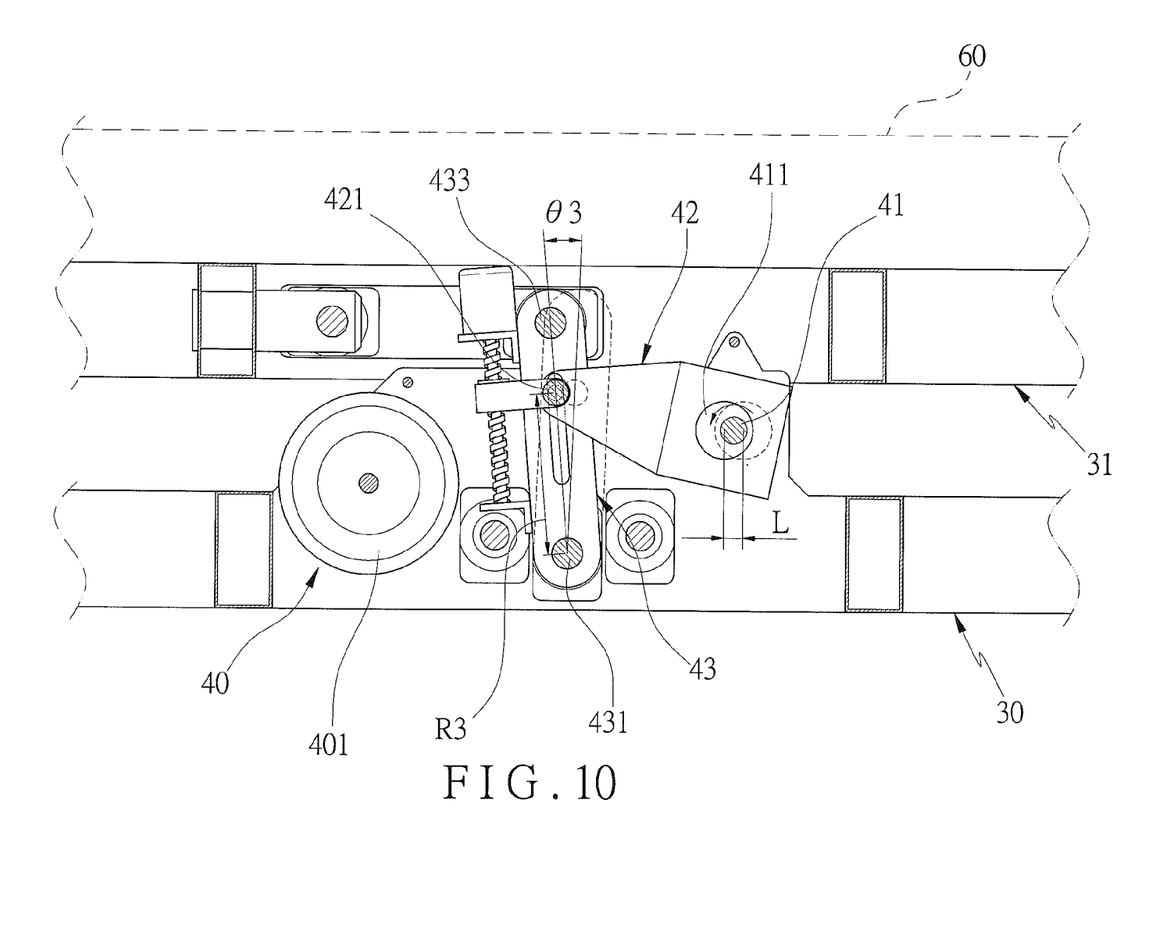
FIG. 10 is another cross sectional view showing the operation of the swingable loading device according to the preferred embodiment of the present invention.

With reference to FIG. 9, as desiring to adjust the support rack 31 to swing reciprocately at a smaller amplitude, the second motor 51 of the displacement assembly 50 drives the threaded rod 52 to revolve so that the threaded rod 52 actuates the moving element 53 to move toward the upper end of the second rotatable arm set 43, and the second rotatable arm set 43 drives the actuation shaft 421 of the first rotatable arm set 42 to move toward the upper end of the second rotatable arm set 43 along of the guiding groove 432 of the second rotatable arm set 43, hence the distance between the actuation shaft 421 of the first rotatable arm set 42 and the rotary shaft 431 of the second rotatable arm set 43 increases to R3. Referring further to FIG. 10, when the first motor 401 of the first drive source 40 drives the crank shaft 41 to rotate, the eccentric section 411 of the crank shaft 41 actuates the first rotatable arm set 42 to swing back and forth, and the actuation shaft 421 of the first rotatable arm set 42 drives the second rotatable arm set 43 to swing reciprocately along the rotary shaft 431. Because the maximum swing distance L of the first rotatable arm set 42 is the fixed value, the distance between the actuation shaft 421 of the first rotatable arm set 42 and the rotary shaft 431 of the second rotatable arm set 43 increases to R3, hence the first rotatable arm set 42 actuates the second rotatable arm set 43 to swing reciprocately at a third swinging angle θ3 less than the first swinging angle θ1, and the connecting post 433 of the second rotatable arm set 43 drives the support rack 31 and the holding plate 60 to swing back and forth on the base 30 within the third swinging angle θ3 less than the first swinging angle θ1. Thereby, the adjustment mechanism adjusts the distance between the actuation shaft 421 of the first rotatable arm set 42 and the rotary shaft 431 of the second rotatable arm set 43 so that the first rotatable arm set 42 drives the second rotatable arm set 43 to swing reciprocately at a smaller amplitude, and the support rack 31 and the holding plate 60 are actuated by the third rotatable arm set 43 to swing reciprocately at the smaller amplitude.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A swingable loading device comprising:
   a base;
   a support rack fixed above the base;
   a swing mechanism housed between the base and the support rack and including a first rotatable arm set fixed on the base and driven by a first drive source, the swing mechanism further including a second rotatable arm set rotatably connected with a rotary shaft on the base, wherein the second rotatable arm set also rotatably connects with an end portion of the first rotatable arm set and the support rack, the first rotatable arm set drives the second rotatable arm set to swing back and forth along the rotary shaft, and the second rotatable arm set drives the support rack to swing reciprocately; and
   an adjustment mechanism including a displacement assembly fixed on the second rotatable arm set, wherein the displacement assembly drives the end portion of the first rotatable arm set to move along the second rotatable arm set so as to adjust a distance between the end portion of the first rotatable arm set and the rotary shaft of the second rotatable arm set.

2. The swingable loading device as claimed in claim 1, wherein a plurality of posts are mounted between and rotatably connected with the base and the support rack, such that the support rack swings back and forth above the base along the plurality of posts.

3. The swingable loading device as claimed in claim 1, wherein the base includes two fixing plates disposed adjacent to a central position thereof, and between the two fixing plates is defined an accommodation space for housing the swing mechanism and the adjustment mechanism.

4. The swingable loading device as claimed in claim 1, wherein the swing mechanism includes a crank shaft mounted on the base and driven by the first drive source to rotate, and the crank shaft rotatably connects with the first rotatable arm set so that the crank shaft drives the first rotatable arm set to swing back and forth.

5. The swingable loading device as claimed in claim 4, wherein the first drive source is a first motor housed on the base, and an output shaft of the first motor and the crank shaft connect with a transmission structure, such that the first motor drives the crank shaft to revolve via the transmission structure.

6. The swingable loading device as claimed in claim 5, wherein the transmission structure includes the output shaft of the first motor, a first belt pulley set connected with the output shaft of the first motor, a first transmission shaft coupled with the first belt pulley set, a second belt pulley set joined with the first transmission shaft, a second transmission shaft connected with the second belt pulley set, and a third belt pulley set coupled with the second transmission shaft and the crank shaft.

7. The swingable loading device as claimed in claim 1, wherein the second rotatable arm set of the swing mechanism has a connecting post mounted on an upper end thereof, and the support rack includes a coupling element configured to rotatably connect with the connecting post of the second rotatable arm set.

8. The swingable loading device as claimed in claim 1, wherein the second rotatable arm set of the swing mechanism has a guiding groove defined thereon, and the first rotatable arm set has an actuation shaft disposed on the end portion thereof, such that the actuation shaft of the first rotatable arm set accommodates in the guiding groove, the displacement assembly further includes a moving element driven by a second drive source, and the moving element has a connection portion configured to rotatably connect with the actuation shaft of the first rotatable arm set and to drive the actuation shaft to move along the guiding groove of the second rotatable arm set.

9. The swingable loading device as claimed in claim 8, wherein the second drive source is a second motor configured to drive a threaded rod, and the moving element screws with a threaded sleeve of the threaded rod, such that the second motor drives the moving element to move, and the moving element actuates the actuation shaft to move along the guiding groove of the second rotatable arm set.

10. The swingable loading device as claimed in claim 1 further comprising a holding plate disposed on the support rack so that user lies, sits or stands on the holding plate.

* * * * *